Jan. 19, 1960
F. FLADER
2,921,769
TURBINE ROTOR
Filed June 8, 1953
3 Sheets-Sheet 2
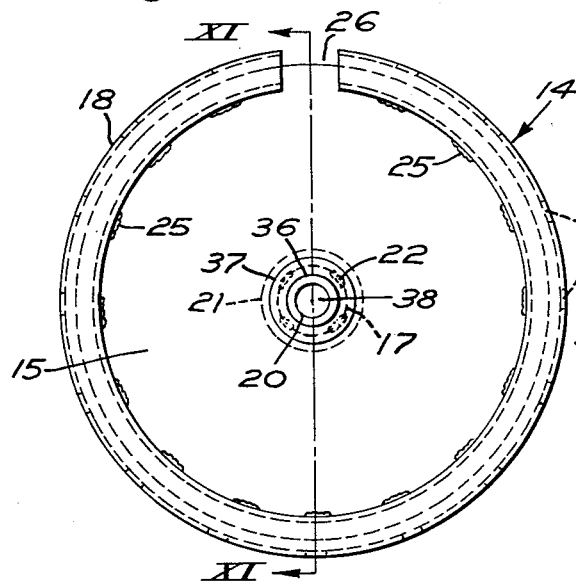
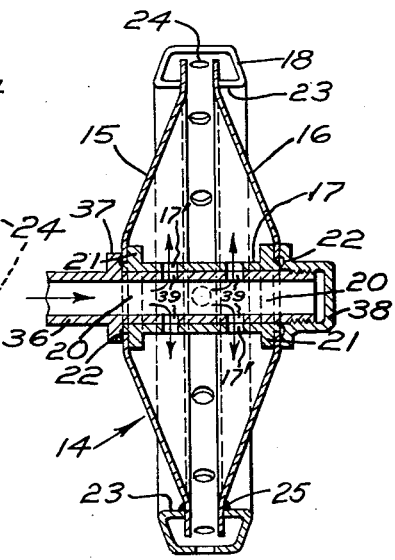
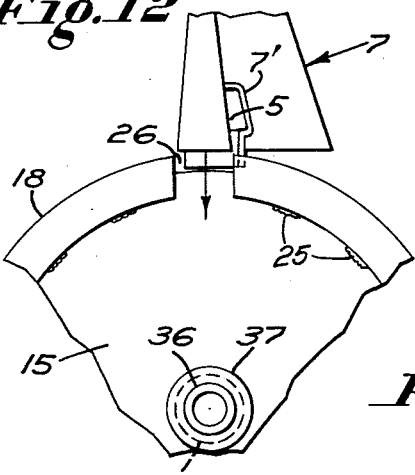
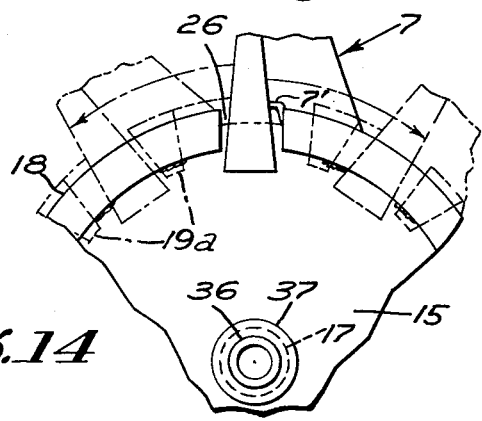
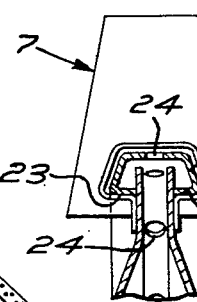
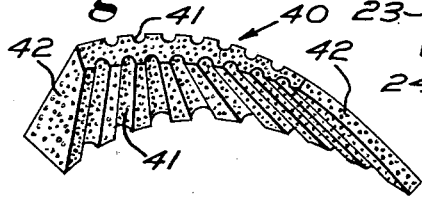
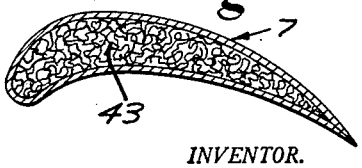
INVENTOR.
FREDRIC FLADER
BY
Beau, Brooks, Buckley & Beau,
ATTORNEYS.

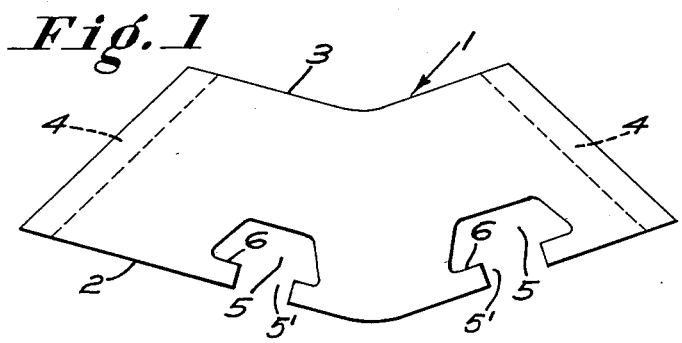
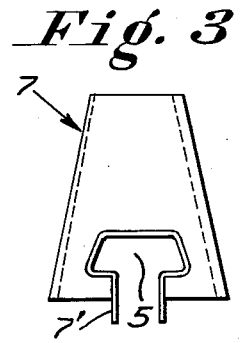
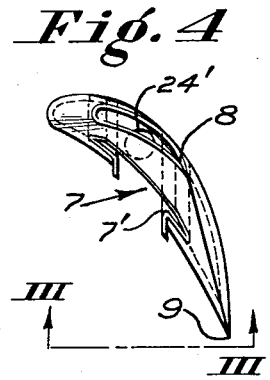
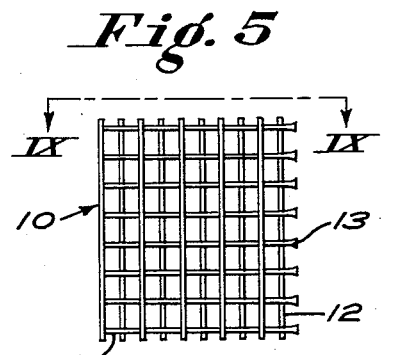
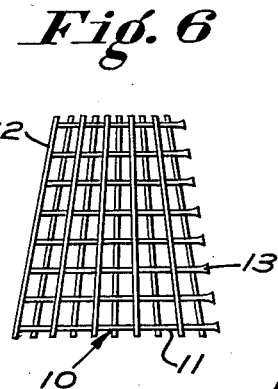
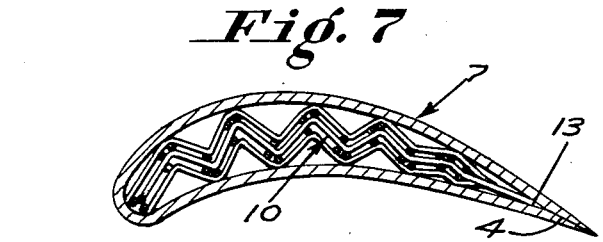
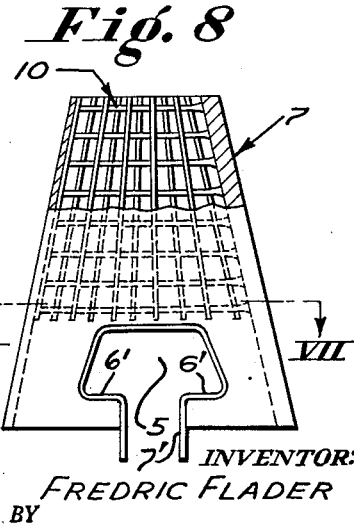
INVENTOR:
FREDRIC FLADER
BY
Beau, Brooks, Buckley & Beau,
ATTORNEYS.

Jan. 19, 1960   F. FLADER   2,921,769
TURBINE ROTOR
Filed June 8, 1953   3 Sheets-Sheet 3
*Fig. 15*
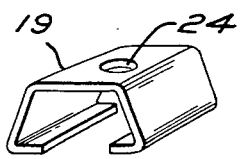
*Fig. 16*
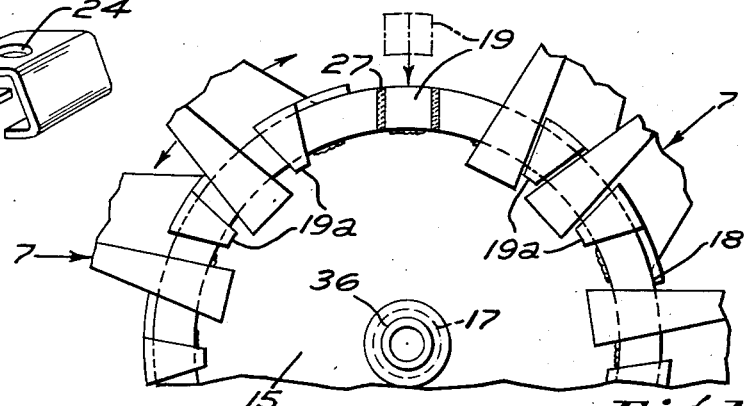
*Fig. 17*
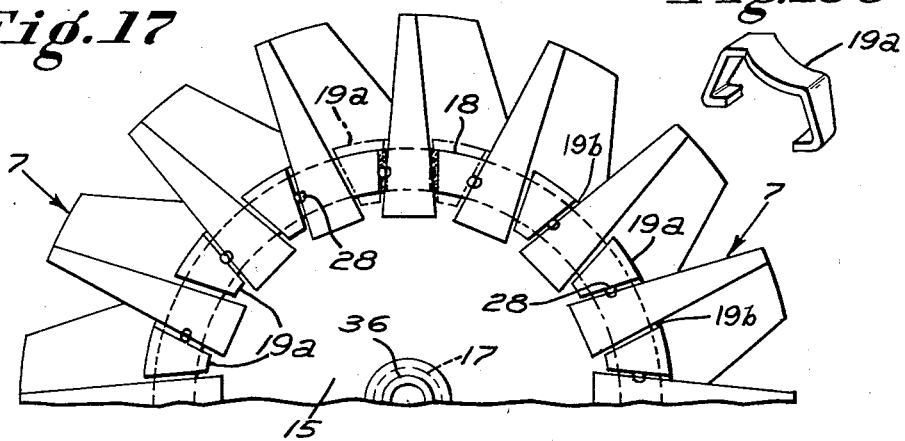
*Fig. 15C*
*Fig. 18*   *Fig. 15A*   *Fig. 19*
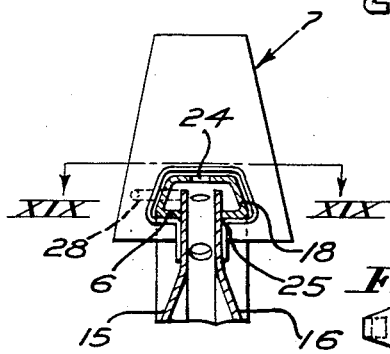
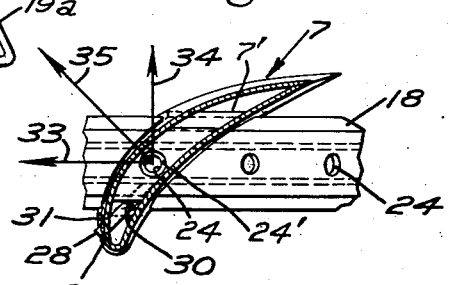
*Fig. 15B*
INVENTOR.
FREDRIC FLADER
BY
Beau, Brooks, Buckley & Beau,
ATTORNEYS.

2,921,769
TURBINE ROTOR

Fredric Flader, Kenmore, N.Y., assignor to Peerless Turbine Corporation, Wilmington, Del.

Application June 8, 1953, Serial No. 360,011

19 Claims. (Cl. 253—39)

This invention relates generally to power generators of the turbine type adapted to be actuated by an elastic fluid, and more particularly to an improved turbine rotor construction adapted for use, by way of example, in gas turbines and turbo jet engines.

A primary object of this invention is to provide an improved arrangement of relatively simple design and construction for supporting the blades on the turbine wheel, which arrangement incorporates improved means for transferring the centrifugal load of the blades to the wheel.

Another object of this invention is to provide improved means for securing the blades to the wheel, which means serve to assist the blades in resisting vibratory and fatigue stresses.

It is also an object of this invention to provide a turbine rotor construction incorporating an improved blade cooling arrangement.

A further object of this invention is to provide an improved turbine blade cooling means permitting direct access of cooling medium to the interior of the blade for cooling the entire length thereof and including indirect cooling surfaces of maximum extent to increase the blade cooling effect.

Still another object of this invention is to provide a practical turbine rotor construction which is relatively simple and economical, being preferably although not necessarily formed of sheet metal, and which is readily fabricated, dependable and long-lasting in operation.

A turbine rotor according to one aspect of this invention comprises a wheel having a laterally enlarged rim portion and blades formed at their root ends to loosely embrace said rim portion for limited rocking movement relative thereto. In a preferred embodiment said blades are of two-piece construction positioned on said wheel by pin means positioned so as to be substantially perpendicular to the resultant of aerodynamic and drag forces on the blade and/or spacer means between the blades, and said wheel comprises a pair of disk members, a spacing hub therebetween, and a laterally enlarged rim member extending substantially but not completely around the periphery of said disk member with the opposite ends of said rim member being spaced apart sufficient to insert therebetween the root end of a blade for sliding the same onto said rim member, there being a rim segment inserted between the opposite ends of said rim member to complete the assembly. A rotor according to another aspect of this invention is characterized by the provision of blade cooling means in the form of porous heat conducting means inserted within the hollow blades and means for passing cooling medium into the wheel and therefrom directly into and through said blades.

The foregoing and other objects will readily manifest themselves from a perusal of the ensuing detailed description, taken together with the accompanying drawings forming a part thereof wherein like reference characters are used to identify like parts throughout the various views and wherein:

Fig. 1 is a plan view of the sheet metal blade pattern used in forming the rotor blades according to this invention;

Fig. 2 is a view in end elevation of the blade pattern shown in Fig. 1;

Fig. 3 is a view in side elevation of a blade in finally contoured form, taken about on line III—III of Fig. 4;

Fig. 4 is a plan view of the contoured blade of Fig. 3, looking toward the root end thereof;

Fig. 5 is a plan view of a heat transfer or cooling insert consisting of a plurality of wire grid sheets or layers similar to wire screening adapted for use in the rotor blade of Fig. 3;

Fig. 6 is a view showing the cooling grid structure of Fig. 5 flexed and deformed to fit within the blade of Fig. 3;

Fig. 7 is a generally schematic sectional view through the blade of this invention with the multiple screen type cooling grid structure therein, taken about on line VII—VII of Fig. 8;

Fig. 8 is a view in side elevation of the blade of Fig. 7 with the cooling grid structure therein, certain parts being broken away for greater clarity;

Fig. 9 is an end view of the cooling grid structure taken about on line IX—IX of Fig. 5 and showing an initial deformation of the multiple layers to a sine wave shape;

Fig. 10 is a view in side elevation of a turbine wheel according to this invention;

Fig. 11 is a sectional view taken about on line XI—XI of Fig. 10;

Fig. 12 is a schematic view showing a preliminary step in the assembly of the blades on the turbine wheel;

Fig. 13 is a schematic view corresponding to Fig. 12 but showing a further step in the assembly of the blades on the turbine wheel;

Fig. 14 is a fragmentary transverse sectional view showing how the rotor blades fit on the turbine wheel rim;

Fig. 15 is a perspective view of a rim segment adapted to complete the turbine wheel rim;

Fig. 15a is an end view of a spacer suitable for maintaining the blades in properly spaced relation;

Fig. 15b is a plan view of the spacer of Fig. 15a;

Fig. 15c is an isometric view of the spacer of Figs. 15a and 15b;

Fig. 16 is a schematic view showing the segment of Fig. 15 secured in place on the turbine wheel;

Fig. 17 is a schematic view in side elevation showing the rotor blades properly spaced around the turbine wheel;

Fig. 18 is a fragmentary detail view, partly in section, showing the manner of securing the blades to the turbine wheel rim;

Fig. 19 is a fragmentary sectional view taken about on line XIX—XIX of Fig. 18, and indicating schematically the relationship between the blade securing means and various forces acting on the blade;

Fig. 20 is a perspective view of an alternate form of heat transfer or cooling insert; and Fig. 21 is a view similar to Fig. 7 but illustrating still another form of heat transfer or cooling means.

For purposes of economy and ease in fabrication, the turbine rotor of this invention is preferably, although not necessarily, formed of sheet metal. To this end, in a preferred embodiment the blades are formed from a flat sheet metal pattern 1 which is thickest at its root end 2 and tapers toward its tip end 3, the side edges thereof being beveled as at 4. Spaced slots or openings 5 of a suitable shape to provide transverse shoulders 6 with an entrance passage 5' therebetween are cut or punched out of the root end 2.

Pattern 1 is then formed to the contour providing the desired shape for the blade, identified as 7 in Fig. 3, and of course variations of the pattern of Fig. 1 can be formed to virtually any desired blade contour. In the preferred embodiment illustrated herein, wherein the rotor is the axial flow type, it will be observed from Fig. 4 that the blade is of a three-dimensional form both tapered and twisted to provide the desired blade design with the root end 2 and tip end 3 being similar but not identical in shape. It will be observed that in the finished form of blade 7 openings 5 are aligned for insertion therethrough of the turbine wheel rim, as will be described more in detail hereinafter. The blade is fixed in its finished form with the beveled edges 4 thereof attached together at 8 and 9, as shown in Fig. 4, as by means of brazing or welding or the like, whereby there is provided a hollow blade open at both ends for cooling purposes and having sufficient bending and torsional rigidity for its intended service. In addition, in a preferred form a brace member 7', also preferably of sheet metal, is welded or otherwise secured to the formed blade 7 within slots 5 to extend through the blade and join the concave and convex surfaces thereof adjacent the root end of the blade. Said brace members provide additional stiffness and follow the outline of slots 5 to provide bearing surfaces 6' for the turbine wheel rim to be described. Brace members 7' also have one or more openings 24' therethrough for a purpose to be described.

As will become more clearly apparent when viewing the rotor in completely assembled form, a cooling arrangement is provided wherein a cooling medium passes through the wheel and directly into and through the hollow blades 7. To enhance the cooling effect and insure satisfactory cooling of the blades, a matter of vital importance when the rotor is subject to high temperatures from hot gases and the like, a heat transfer or indirect cooling surface of maximum extent is provided interiorly of each blade 7. Such cooling surfaces may comprise, for example, an insert in the nature of a multiple layer grid assembly or structure, generally designated 10 in Figs. 5 through 9, of rods or wires of suitable heat conducting metal, and initially comprising a plurality of chordwise rods or wires 11 formed in a sine wave or other similar pattern and secured to a plurality of longitudinal rods or wires 12 as by means of a conventional dip or furnace brazing process, as illustrated in Figs. 5 and 9. It will be noted that rods 11 project at one side of the grid 10, and these projecting ends are flattened to a knife edge 13. The grid structure 10 of Figs. 5 and 9 is then suitably flexed and deformed, as illustrated in Fig. 6, to fit snugly within the hollow blade 7 and follow the interior contour thereof, as illustrated in Figs. 7 and 8, with the ends 13 fitting in the re-entrant angle formed by edges 4 of the blade and dip or furnace brazed thereto whereby grid 10 is secured in place therein. A structure of similar nature may be made by superimposing several layers of fine wire screening, deforming the same to a sine wave pattern and final forming thereof to fit the internal contours of the turbine blade, which structure would have substantially the same appearance as grid assembly 10.

The turbine wheel of the instant invention is of simplified and economical construction, being generally indicated at 14, see Figs. 10 and 11, and comprising a five piece construction consisting of two contoured and symmetrical disks of plates 15 and 16, a spacing hollow hub member 17, a continuous rim member 18 extending substantially but not completely around the periphery of disks 15 and 16, and a rim segment 19 (Fig. 15).

Hub member 17 extends between disks 15 and 16 and through center openings 20 therein, and is provided with flange portions 21 slightly spaced from its opposite ends, whereby said disks will bear against flanges 21 when assembled on hub member 17. Said hub member and disks are secured together by any desired means, as for example welding 22, and it will be observed that hub member 17 acts as a spacer for the disks 15 and 16 as well as serving to mount the turbine rotor on an appropriate drive shaft, not shown. Hub member 17 is hollow and has a plurality of radial openings 17' therethrough for a purpose to be described.

Rim member 18 is preferably fabricated from sheet metal, and comprises an inverted channel construction having inwardly extending flanges providing shoulders 23 along its open side, and a plurality of openings 24 along its top wall for a purpose to be described. Rim member 18 is positioned adjacent the periphery of disks 15 and 16, being attached thereto at spaced points therealong as by welding 25, and it will be observed that rim member 18 is slightly less in circumferential extent than the circumference of disks 15 and 16, whereby to provide a slot 26 in the wheel rim portion of a size to receive blades 7 and rim segment 19.

Figs. 15a, b and c illustrate a spacer 19a of suitable form and shape to fit over rim member 18 between the blades assembled thereon, as illustrated in Figs. 12, 13, 16 and 17, the blades and spacers forming a compact and contiguous peripheral assembly in which the spacers serve to keep the blades in properly spaced relation. Spacers 19a have a loose fit between blades 7, as illustrated at 19b in Fig. 17, to allow limited oscillatory movement of the blades relative to the rim member as will be described hereafter. It will be noted that spacers 19a interlock with rim member 18 in a manner similar to the blade root end portions.

The turbine of this invention is assembled in the manner illustrated in Figs. 12 through 19. Thus, blades 7 are first moved radially into slot 26 and then circumferentially along rim member 18 as clearly illustrated in Figs. 12 and 13, being movable therealong in either direction as clearly shown. It will be observed from Fig. 14 that blades 7 and brace members 7' thereof embracingly receive rim member 18 in their root end openings 5 with bearing surfaces 6' of brace members 7' bearing against shoulders 23 of said rim member, whereby the blades are secured against movement radially outwardly of rim member 18 with centrifugal loads on the blades being transferred to the wheel through a relatively simple attachment arrangement of more than adequate strength. At the same time, openings 5 and brace members 7' are slightly larger than rim member 18, as clearly illustrated in Fig. 14, whereby the blades are permitted a limited amount of oscillatory or pivotal movement relative to rim member 18 as indicated by the arrows in Fig. 16. This fastening arrangement provides a limited pin joint or hinge effect and greatly enhances the ability of the blades to resist vibratory and fatigue stresses.

After the required number of blades 7 are assembled on the turbine wheel, slot 26 is closed by inserting segment 19 therein, said segment being secured in place as by welding 27, all as illustrated in Fig. 16. Segment 19 is identical in form with rim member 18, including the provision of an opening 24 therethrough, and therefore rim member 18 and segment 19 together comprise a continuous rim portion extending completely around the periphery of disks 15 and 16.

Blades 7 are then secured in position on the turbine wheel with each blade being secured in its proper circumferential position over an opening 24 by means of a pin 28 extending through a hole 29 (Fig. 19) in the blade and an aligned hole 30 in the wheel rim into abutting relation with disk 15 adjacent its outer periphery, as clearly illustrated in Fig. 19. Pins 28 project slightly outwardly from blades 7, and are secured thereto as by means of welding 31. In this way, each blade is fixed in its proper circumferential position while being permitted a limited amount of freedom of oscillatory or pivotal movement as previously described, and thus the final assembly comprises a relatively simple, practical, inexpensive and readily fabricated turbine rotor construction. It should be noted that spacers 19a and pins 28 are not necessarily both required as spacers 19a alone may be used or pins 28 alone may be used or the spacers and pins may be used in any combination.

Fig. 19 is a schematic view indicating certain forces on a blade, the heat transfer grid therein being eliminated from this view for purposes of clarity. In this view arrow 33 represents a tangential force on blade 7 due to aerodynamic force and arrow 34 represents a drag force on the blade, arrow 35 representing the resultant force therefrom, and it will be observed that pin 28 is positioned so as to be perpendicular to such resultant force 35 whereby to provide a blade positioning arrangement of maximum strength.

A particular feature and advantage of a turbine rotor according to the instant invention resides in the blade cooling arrangement provided thereby. Cooling medium such as air is introduced between disks 15 and 16 in any desired manner, as for example by means of a hollow shaft 36 mounting hub member 17 and having a laterally extending flange portion 37 bearing against one end of member 17 and an end cap 38 threaded on shaft 36 and bearing against the opposite end of member 17 whereby said shaft and said hub member are arranged for rotation in unison. Shaft 36 is provided with radial openings 39 in registry with openings 17' in hub member 17, and cooling medium passes through shaft 36 and openings 39 and 17' into the space between disks 15 and 16, as shown by the arrows in Fig. 11, and from there the cooling medium passes out through the rim openings 24 directly into the hollow blades 7 which are aligned therewith. The cooling medium then washes through the blades and openings 24' and over the cooling grids 10, passing out through the open tip ends of the blades, whereby a maximum cooling effect is obtained, the heat transfer cooling grid structures being of maximum extent.

An alternative form of cooling insert is illustrated at 40 in Fig. 20, and comprises a block of air porous heat transfer material such as powdered metal. Block 40 is preferably pre-shaped and then inserted in a blade 7 where it is secured in place by brazing or other conventional technique. In a preferred form, staggered slots 41 are provided on opposite sides of block 40 and the leading and trailing edges thereof are cut off as at 42, whereby to ensure proper distribution of cooling medium and to provide coolant passages between the insert and the blade walls.

Still another form of cooling or heat transfer insert is illustrated in Fig. 21 as comprising strands 43 of heat conducting material such as copper or copper alloy filling the blade 7. Strands 43 are similar, for example, to steel wool, and are secured to the blade walls by brazing.

Therefore, it will seem that the instant invention fully accomplishes the aforesaid objects, and provides a practical turbine rotor construction which is relatively inexpensive to manufacture and simple in construction, and which includes new and improved blade supporting and attaching means together with a new and superior blade cooling arrangement. It will be appreciated that this invention is not necessarily limited to the details of construction disclosed herein but comprehends various modifications thereof as determined by the scope of the appended claims.

Having fully disclosed and completely described this invention, together with its mode of operation, what is claimed as new is:

1. In a turbine rotor, a pair of wheel disks, a hub member secured to said disks centrally thereof and maintaining said disks in properly spaced assembled relation, said hub member being adapted for securing said disks to a drive shaft, a rim member embracing the periphery of said pair of disks and extending substantially completely therearound, said rim member being secured to said disks and providing shoulders extending laterally beyond the opposite sides of said pair of disks, a plurality of blades having root end portions formed to slidably embrace said rim member in interlocking relation therewith, said root end portions extending around said rim member for bearing against said shoulders under the influence of centrifugal force, the opposite circumferential ends of said rim member being spaced apart a distance sufficient to permit said root end portions of said blades to pass therebetween, and a rim segment secured to the periphery of said pair of disks between said opposite ends of said rim member in bridging relation therewith, said rim segment having a contour substantially identical with said rim member whereby to form a continuation thereof.

2. In a turbine rotor, a pair of wheel disks formed of sheet metal, a hub member secured to said disks centrally thereof for maintaining said disks in properly spaced assembled relation, said hub member being adapted to secure said assembled disks to a drive shaft, an integral rim member formed of sheet metal extending substantially completely around the periphery of said pair of disks, said rim member being of substantially inverted channel form in transverse section to receive and embrace the peripheral portions of said pair of disks and having inturned flanges spaced apart to permit entry of said disks into said channel while bearing against said disks and being secured thereto, a plurality of rotor blades each formed of sheet metal and having a root end portion cut out to slidably receive said rim member therethrough, the open ends of said cut out root portions having inturned flanges adapted to bear against the underside of said rim member flanges, the opposite circumferential ends of said rim member being spaced apart a distance sufficient to permit said root end portions of said blades to be inserted therebetween, and a rim segment formed of sheet metal to provide a contour substantially identical with said rim member, said rim segment being secured to the periphery of said pair of disks between said opposite ends of said rim member in bridging relation therewith to form a continuation thereof.

3. A turbine rotor as set forth in claim 1, wherein said disks are symmetrical centrally thereof.

4. A turbine rotor comprising a wheel adapted for mounting on a drive shaft, rim means extending around the periphery of said wheel, said rim means providing lateral shoulders on opposite sides of said wheel, and a plurality of blades each having a root end portion loosely embracing said rim means and extending beneath said shoulders, whereby said root end portions lock said blades on said rim means against movement radially outwardly of said wheel while enabling limited oscillatory movement of said blades relative to said wheel, said limited oscillatory movement being deliberately provided to enhance the ability of said blades to resist vibratory and fatigue stresses and being maintained in the final rotor assembly.

5. A turbine rotor comprising a wheel adapted for mounting on a drive shaft, rim means extending around the periphery of said wheel, said rim means providing lateral shoulders on opposite sides of said wheel, and a plurality of blades each having a root end portion loosely embracing said rim means and extending beneath said shoulders, whereby said root end portions lock said blades on said rim means against movement radially outwardly of said wheel while permitting limited oscillatory movement of said blades relative to said wheel, each of said blades comprising a hollow sheet metal fabrication, each of said root end portions being formed to provide spaced apart aligned slots loosely receiving said rim means and transverse shoulders extending beneath said lateral shoulders, and a stiffening brace member for each of said blades having a cross sectional contour substantially conforming to said slots and transverse shoulders also loosely embracing said rim means, said brace members extending between said slots transversely of the root end portions of said blades, said brace members stiffening said blades and providing bearing surfaces between said transverse shoulders and said lateral shoulders.

6. A turbine rotor comprising a wheel adapted for mounting on a drive shaft, rim means extending around the periphery of said wheel and providing lateral shoulders on opposite sides thereof, multiple blades each having a root end portion formed to extend around said rim means and under said shoulders in loosely embracing relation therewith, whereby said blades are locked to said rim means against movement radially outwardly of said wheel while being permitted limited oscillatory movement relative thereto, said limited oscillatory movement being deliberately provided to enhance the ability of said blades to resist vibratory and fatigue stresses, and pin means extending between said blades and said rim means to secure said blades in position therealong, said limited oscillatory movement being maintained in the final rotor assembly.

7. A turbine rotor comprising a pair of substantially identical wheel disks, hub means secured to said disks centrally thereof for maintaining the same in spaced-apart assembled relation, said hub means having a passage therethrough into the space between said disks for cooling medium, rim means extending between and secured to said disks along the periphery thereof, said rim means having a series of spaced openings centrally therealong in alignment with the space between said disks and providing lateral shoulders on opposite sides of said assembled disks, and a plurality of hollow blades open adjacent their root ends and adjacent their tip ends, said blades having root end portions extending around and under said rim means in loosely embracing relation thereto for limited oscillatory movement thereon to enhance the ability of said blades to resist vibratory and fatigue stresses and being secured to said rim means in direct alignment with said spaced openings while maintaining such limited oscillatory movement, whereby cooling medium introduced through said hub means and between said disks will have direct access to the interior of said blades for blade cooling purposes.

8. A turbine rotor comprising a wheel, rim means extending around said wheel adjacent the periphery thereof and providing lateral shoulders on opposite sides thereof, a blade of hollow form having a root end portion slotted to extend around said rim means and under said shoulders in loosely embracing relation therewith, whereby said blade is locked to said rim means against movement radially outwardly of said wheel while being permitted limited oscillatory movement relative thereto, cooling passage means extending radially outwardly through said wheel and said rim means, and means including pin means securing said blade to said rim means in alignment with said cooling passage means, said pin means extending along a line substantially perpendicular to the resultant of the aerodynamic and drag forces acting on said blade in use.

9. In a turbine rotor, a wheel having spaced walls, rim means bridging said walls adjacent the periphery thereof and providing lateral shoulders on opposite sides of said wheel, said rim means having a series of radial openings therethrough spaced apart therealong in communication with the space between said walls, a series of hollow blades open adjacent their root and tip ends and having root end portions formed to extend around said rim means and laterally inwardly beneath said shoulders, said blades loosely embracing said rim means for limited oscillatory movement thereon to enhance the ability of said blades to resist vibratory and fatigue stresses and being secured to said rim means at spaced points therealong in direct alignment with said openings while maintaining such limited oscillatory movement, and insert means of heat-conducting metal arranged within said hollow blades, whereby cooling medium introduced into said wheel will pass through said hollow blades and wash over said insert means.

10. A turbine rotor as set forth in claim 9 wherein said insert means comprise grids formed of a series of undulating rods connected by a series of rods extending at an angle thereto deformed to follow the interior contour of said blades, whereby to provide a heat transfer surface of maximum extent.

11. A turbine rotor as set forth in claim 9, wherein said insert means comprise fillers of metal wool strands.

12. In combination with a turbine rotor wheel having a rim therearound providing lateral shoulders on opposite sides thereof and means for passing cooling medium outwardly through said rim, a rotor blade comprising, wall means defining a hollow blade body open adjacent the root and tip ends thereof, said root end being formed to extend around said rim and under said shoulders, and insert means of heat-conducting metal arranged within said hollow blade body to provide an extended heat transfer surface therein, wherein said insert means comprises a powdered metal block cut off at its leading and trailing edges and slotted along its sides to provide coolant passages between said block and said blade body wall means.

13. A turbine rotor as set forth in claim 9, wherein each of said blades comprises an integral wall portion having matching edges secured together to provide a re-entrant angle interiorly thereof, and wherein said insert means comprise grids of heat-conducting metal within said blades, said grids being formed to follow the interior contour of said blades and having knife edge portions along one side edge thereof secured within said re-entrant angles.

14. A turbine blade comprising an integral hollow sheet metal body open at its root and tip ends and defining a passage for coolant through said blade from said root end to said tip end thereof and having a root end portion formed to provide aligned slots each having an entrance passage to receive a turbine wheel rim portion having lateral shoulders on opposite sides thereof, said root end portion also providing lateral shoulders adjacent said entrance passages to said slots on opposite sides thereof for extending beneath and engaging such lateral shoulders on such rim portion.

15. A turbine blade comprising an integral hollow sheet metal body having a root end portion formed to provide in opposite walls thereof aligned slots each formed with an entrance passage to receive a turbine wheel rim portion having lateral shoulders on opposite sides thereof, said root end portion also providing inwardly extending shoulders adjacent said entrance passages to said slots for extending beneath such lateral shoulders on such rim portion, together with a brace member having a transverse sectional form substantially corresponding to the outline of said slots and extending between said opposite walls in alignment with said slots to stiffen said blade.

16. A turbine rotor wheel comprising a pair of symmetrical disks, hub means maintaining said disks in spaced-apart assembled relation centrally thereof, a rim member of inverted channel form fitted over the periphery of said disks and extending substantially completely therearound, the sides of said rim member being inturned to provide laterally inwardly extending flanges secured to the peripheral portions of said assembled disks and maintaining the same in spaced apart relation, the opposite circumferential ends of said rim member being spaced apart a distance sufficient to permit insertion therebetween of the root portion of a blade for placement on said rim member, and a rim segment substantially identical in contour with said rim member and of a length substantially equal to the distance between said opposite ends of said rim member, said rim segment being positioned in the gap between said ends of said rim member after placement of blades on said rim member to close said gap and form with said rim member a continuous wheel rim.

17. A turbine rotor as set forth in claim 4, together with spacer means secured to said rim means between adjacent of said blades and having a loose fit therebetween to maintain said blades in properly spaced relation around said rim means while permitting such limited oscillatory movement of said blades.

18. In a turbine rotor, a pair of wheel disks, hub means secured to said disks and maintaining them in properly spaced assembled relation, a rim means embracing the periphery of said pair of disks and extending substantially completely therearound, said rim means being secured to said disks and providing shoulders extending laterally therefrom on opposite sides of said pair of disks, a plurality of rotor blades having root end portions formed to slidably embrace said rim means in interlocking relation therewith, said root end portions extending around said rim means for bearing against said shoulders under the influence of centrifugal force, said rim means defining a slot of sufficient circumferential extent to permit said root end portions of said blade to pass therethrough for sliding assembly onto said rim means, and a rim segment secured to said disks in alignment with said rim means in bridging relation to said slot, said rim segment forming substantially a continuation of said rim means.

19. A turbine blade comprising an integral hollow sheet metal body open at its root and tip ends and defining a passage for coolant through said blade from said root end to said tip end thereof and having a relatively thick walled root end portion attenuating to a relatively thin walled tip end portion, said root end portion being formed to provide aligned slots each having an entrance passage to receive a turbine wheel portion having lateral shoulders on opposite sides thereof, said root end portion also providing lateral shoulders adjacent said entrance passages to said slots on opposite sides thereof for extending beneath and engaging such lateral shoulders on such rim portion.

References Cited in the file of this patent

UNITED STATES PATENTS

| | | |
|---|---|---|
| 819,105 | Wilkinson | May 1, 1906 |
| 819,106 | Wilkinson | May 1, 1906 |
| 913,273 | Emden | Feb. 23, 1909 |
| 926,442 | Smoot | June 29, 1909 |
| 1,072,233 | Imle | Sept. 2, 1913 |
| 1,371,768 | Sullivan | Mar. 15, 1921 |
| 1,452,602 | Herr | Apr. 24, 1923 |
| 1,680,785 | Herr | Aug. 14, 1928 |
| 2,036,083 | Robinson | Mar. 31, 1936 |
| 2,103,905 | Hillner | Dec. 28, 1937 |
| 2,157,827 | Kliemann | May 9, 1939 |
| 2,199,243 | Mortimer | Apr. 30, 1940 |
| 2,229,799 | Dean | Jan. 28, 1941 |
| 2,297,446 | Zellebeck | Sept. 29, 1942 |
| 2,405,190 | Darling | Aug. 6, 1946 |
| 2,431,249 | Heppner | Nov. 18, 1947 |
| 2,628,065 | Lombard | Feb. 10, 1953 |
| 2,647,368 | Triebbnigg | Aug. 4, 1953 |
| 2,648,520 | Schmitt | Aug. 11, 1953 |
| 2,665,881 | Smith | Jan. 12, 1954 |
| 2,727,716 | Feilden | Dec. 20, 1955 |

FOREIGN PATENTS

| | | |
|---|---|---|
| 61,652 | Norway | Oct. 30, 1939 |
| 302,953 | Great Britain | Dec. 21, 1928 |
| 651,787 | Great Britain | Apr. 11, 1951 |
| 651,830 | Great Britain | Apr. 11, 1951 |
| 1,022,398 | France | Dec. 17, 1952 |